(12) United States Patent
Shih

(10) Patent No.: US 9,850,935 B2
(45) Date of Patent: Dec. 26, 2017

(54) HOLE EXPANDING SCREW

(71) Applicant: BI-MIRTH CORP., Kaohsiung (TW)

(72) Inventor: Yi-Chieh Shih, Kaohsiung (TW)

(73) Assignee: Bi-Mirth Corp., Kaohsiung (TW)

( * ) Notice: Subject to any disclaimer, the term of this patent is extended or adjusted under 35 U.S.C. 154(b) by 52 days.

(21) Appl. No.: 15/049,508

(22) Filed: Feb. 22, 2016

(65) Prior Publication Data

US 2017/0241463 A1   Aug. 24, 2017

(51) Int. Cl.
*F16B 25/10* (2006.01)
*F16B 35/04* (2006.01)
*F16B 25/00* (2006.01)

(52) U.S. Cl.
CPC ........ *F16B 25/103* (2013.01); *F16B 25/0015* (2013.01); *F16B 25/10* (2013.01); *F16B 35/048* (2013.01)

(58) Field of Classification Search
CPC .............. F16B 25/0015; F16B 25/0036; F16B 25/0052; F16B 25/0057; F16B 25/0084; F16B 25/103; F16B 35/044; F16B 35/048; F16B 35/06; F16B 25/10
USPC ........ 411/387.2, 387.3, 387.5, 411–412, 418
See application file for complete search history.

(56) References Cited

U.S. PATENT DOCUMENTS 2,183,243 A * 12/1939 Meersteiner ............ F16B 19/02
411/453
3,982,464 A * 9/1976 Sygnator ............. F16B 25/0031
408/224
5,827,030 A * 10/1998 Dicke ................. F16B 25/0015
411/386
6,698,987 B1 * 3/2004 Dicke ................. F16B 25/0031
411/387.4
6,739,815 B2 * 5/2004 Takasaki ............. F16B 25/0015
411/387.1
7,293,947 B2 * 11/2007 Craven ................. F16B 35/065
411/387.2
2005/0175432 A1 * 8/2005 Su ........................ F16B 25/0015
411/417
2007/0166124 A1 * 7/2007 Hsu ..................... F16B 25/0015
411/387.1

(Continued)

FOREIGN PATENT DOCUMENTS

TW    M491743 U    12/2014

*Primary Examiner* — Roberta S Delisle
(74) *Attorney, Agent, or Firm* — Muncy, Geissler, Olds & Lowe, P.C.

(57) ABSTRACT

A hole expanding screw comprises a screw head and a screw shank. The screw head includes a top and a neck extending from the top and gradually shrinking toward a direction opposite the top. The screw shank includes a shank body connected with the neck, a hole expanding portion connected with the shank body, a cone connected with the hole expanding portion, a thread running helically from the cone through the hole expanding portion to the shank body. The outer diameter of the hole expanding portion is greater than the diameter of the shank body and smaller than the diameter of the thread. The hole expanding portion includes a plurality of hole expanding blocks arranged into several rows and a plurality of debris exhaust channels formed among the hole expanding blocks, wherein each two neighboring rows of the hole expanding blocks are arranged in a staggered way.

7 Claims, 5 Drawing Sheets

(56) References Cited

U.S. PATENT DOCUMENTS

| | | | |
|---|---|---|---|
| 2007/0237606 A1* | 10/2007 | Takasaki | F16B 25/0015 411/387.2 |
| 2007/0269287 A1* | 11/2007 | Runge | F16B 25/00 411/378 |
| 2009/0003966 A1* | 1/2009 | Hsu | F16B 15/06 411/394 |
| 2010/0158634 A1* | 6/2010 | Walther | F16B 25/0015 411/399 |
| 2012/0294693 A1* | 11/2012 | Gonciarz | F16B 25/0063 411/387.1 |
| 2013/0011214 A1* | 1/2013 | Lin | F16B 25/0015 411/387.4 |
| 2013/0039720 A1* | 2/2013 | Shih | F16B 25/0047 411/387.4 |
| 2014/0294534 A1* | 10/2014 | Park | F16B 25/0052 411/387.1 |
| 2015/0184685 A1* | 7/2015 | Su | F16B 25/103 411/387.2 |

* cited by examiner

HOLE EXPANDING SCREW

FIELD OF THE INVENTION

The present invention relates to a hole expanding screw, particularly to a hole expanding screw able to reduce screwing torque and prevent the screwed workpiece from cracking.

BACKGROUND OF THE INVENTION

A greater force is required to drive a wood screw while screwing harder wood. Besides, the wood debris generated during screwing is usually exhausted out ineffectively and incompletely, likely to accumulate inside the wood and squeeze mutually, which may cause the wood to crack.

A Taiwan patent No. M491743 disclosed a wood screw, which comprises a screw head and at least one first thread, and a screw shank. The screw shank includes a parallel portion, a tapered portion growing thinner gradually, a tip formed on the terminal of the tapered portion. A pattern is formed on the tapered portion, enabling the user to drive the wood screw into wood without drilling a hole beforehand, preventing wood from cracking, and reducing screwing torque.

However, the pattern of the conventional wood screw consists of irregular protrusions, which may result in uneven biting force between the wood screw and the workpiece and cause insecure fixing and shaking. Besides, the pattern does not have debris exhaust structure. Thus, wood debris may accumulate between the pattern and the workpiece and cause cracks during screwing. Therefore, the conventional technology still has room to improve.

SUMMARY OF THE INVENTION

One objective of the present invention is to solve the problem that the conventional screw is likely to cause cracks of workpieces during screwing operation.

To achieve the abovementioned objective, the present invention proposes a hole expanding screw, which comprises a screw head and a screw shank. The screw head includes a top and a neck extending from the top and gradually shrinking toward a direction far away from the top. The screw shank includes a shank body connected with the neck, a hole expanding portion connected with the shank body, a cone connected with the hole expanding portion, and a thread running helically from the cone through the hole expanding portion to the shank body. The outer diameter of the hole expanding portion is greater than the diameter of the shank body and smaller than the diameter of the thread. The hole expanding portion includes a plurality of hole expanding blocks arranged in rows, wherein two neighboring rows of the hole expanding blocks are arranged in a staggered way; and a plurality of debris exhaust channels among the hole expanding blocks.

In one embodiment, each hole expanding block includes a cutting tip and a plurality of slopes extending from the cutting tip and inclined toward the surface of the screw shank.

In one embodiment, each hole expanding block is in form of a pyramid.

In one embodiment, the neck includes a plurality of protrudent ribs.

In one embodiment, the length of the hole expanding portion is equal to the length of 1-2 pitches of the thread.

In one embodiment, the width of the debris exhaust channel is smaller than the pitch of the thread.

In one embodiment, the planar angle of the debris exhaust channel is within 55-70 degrees.

In one embodiment, the shank body includes an oblique thread neighboring one side of the thread, which is corresponding to the screw head.

In one embodiment, the screw shank includes a terminal cutting groove formed on one side of the cone.

In one embodiment, the outer rim of the thread includes a plurality of toothed cutting edges.

Thereby, the present invention has at least the following advantages:
1. Using the hole expanding portion to form a larger hole before the thread bites the wall of the screwed hole to decrease the resistant force for the succeeding biting operation of the thread;
2. Exhausting the debris generated by the hole expanding portion along the debris exhaust channels to prevent the debris from accumulating and cracking the workpiece; and
3. Extending the thread through the hole expanding portion to securely fix the workpiece while the hole expanding portion is screwing and avoid shaking or misalignment of the screw.

DETAILED DESCRIPTION OF THE PREFERRED EMBODIMENTS

Figure 1:
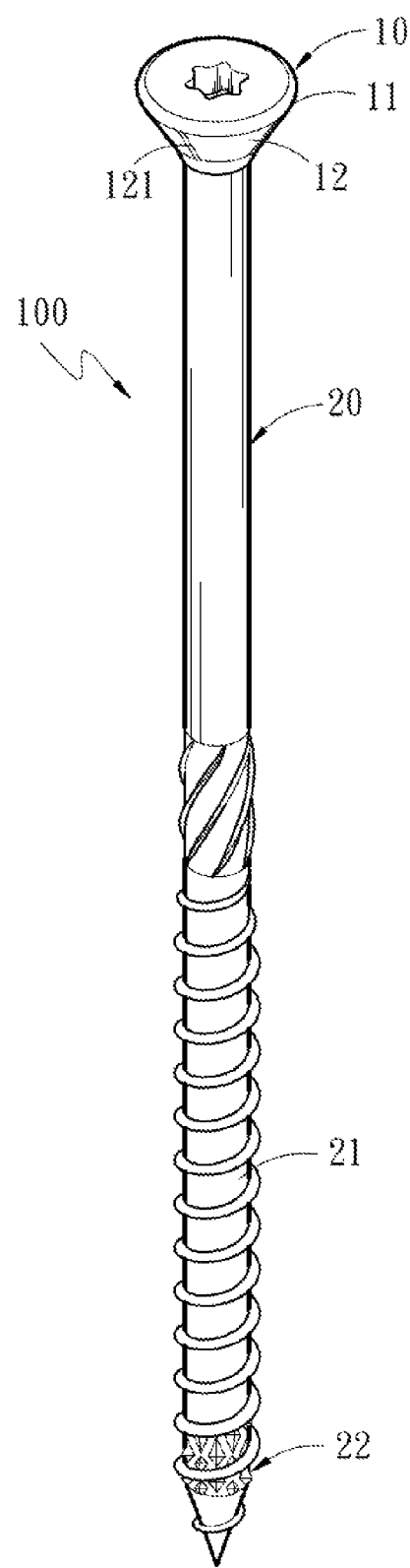
FIG. 1 is a perspective view schematically showing a hole expanding screw according to one embodiment of the present invention.

Refer to FIG. 1. The present invention proposes a hole expanding screw 100, which comprises a screw head 10 and a screw shank 20 connected with the screw head 10. The hole expanding screw 100 of the present invention exempts the user from drilling a hole on the workpiece beforehand, such as wooden floor panels or wooden furniture.

Figures 2A, 2B:
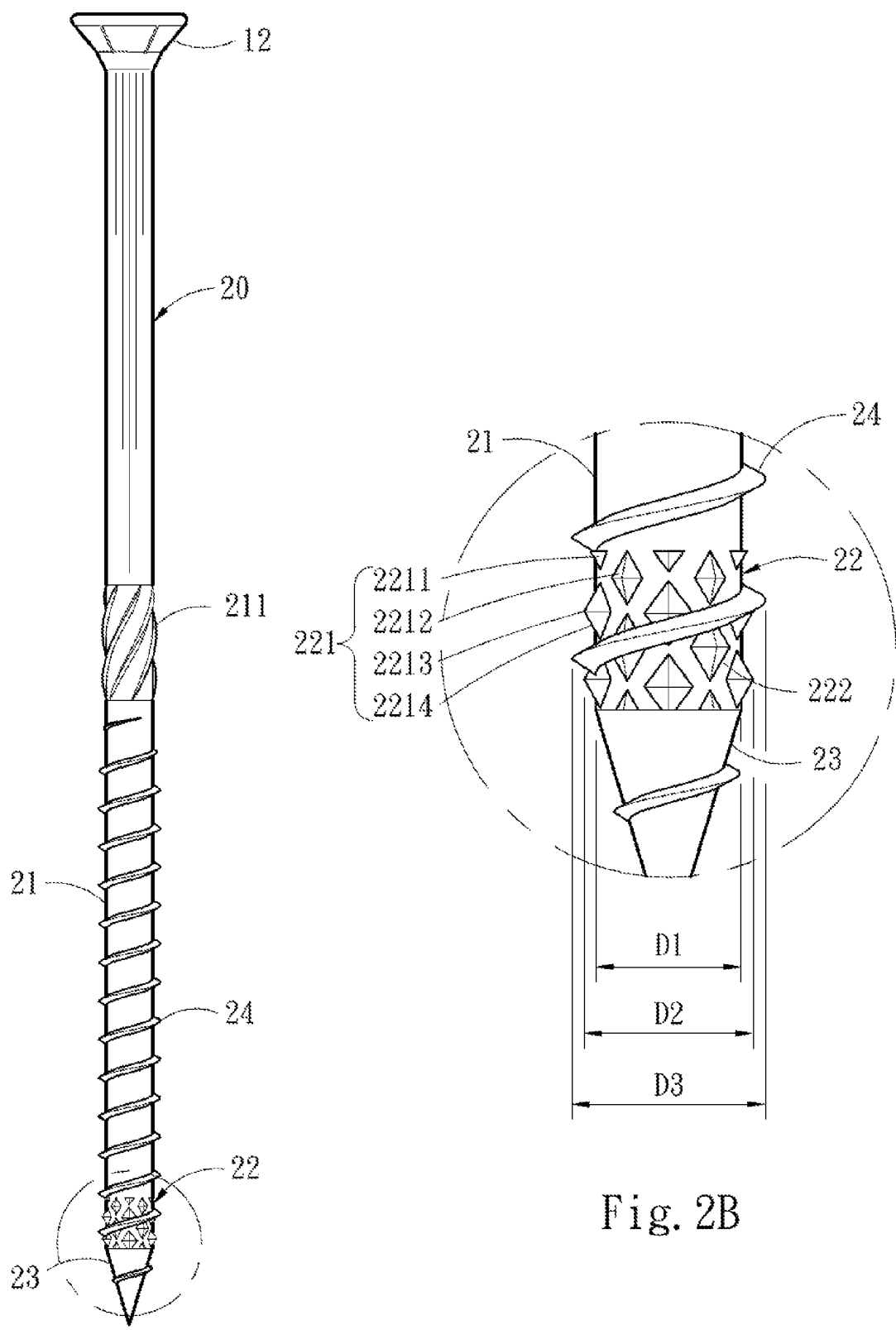
FIG. 2A is a planar graph schematically showing a hole expanding screw according to one embodiment of the present invention.
FIG. 2B is a locally enlarged view of FIG. 2A.

The screw head 10 includes a top 11 and a neck 12 extending from the top 11 and gradually shrinking toward a direction opposite the top 11. The neck 12 includes a plurality of protrudent ribs 121 enhancing the fixing security of the hole expanding screw 100 to the workpiece after the hole expanding screw 100 has been screwed into the workpiece. Refer to FIG. 2A and FIG. 2B. The screw shank 20 includes a shank body 21 connected with the neck 12, a hole expanding portion 22 connected with the shank body 21, a cone 23 connected with the hole expanding portion 22, and a thread 24 running helically from the cone 23 through the hole expanding portion 22 to the shank body 21. During screwing operation, the hole expanding portion 22 expands the screwed hole and increases the movement freedom of the screw shank 20. The thread 24 running helically through the hole expanding portion 22 bites the workpiece and compensate for the decreased fixing security caused by expanding the screwed hole. Preferably, the length of the hole expanding portion 22 is equal to the length of 1-2 pitches of the thread 24 so that the hole expanding portion 22 can achieve the hole expanding effect without causing too great a resistant force between the hole expanding portion 22 and the workpiece. The shank body 21 includes an oblique thread 211 neighboring one side of the thread 24, which is corresponding to the screw head 10. The oblique thread 211 can guide and exhaust the wood debris out of the workpiece.

The outer diameter D2 of the hole expanding portion 22 is greater than the diameter D1 of the shank body 21 and smaller than the diameter D3 of the thread 24. Thus, the hole expanding portion 22, whose outer diameter D2 is an intermediate between the diameter D1 of the shank body 21 and the diameter D3 of the thread 24, can drill beforehand an expanded hole, whose diameter is greater than the diameter D1 of the shank body 21 and smaller than the diameter D3 of the thread 24, whereby the contact area and frictional force between the shank body 21 and the workpiece are reduced in the succeeding screwing operation. Thus, the user can screw the workpiece less laboriously.

Figure 3A:
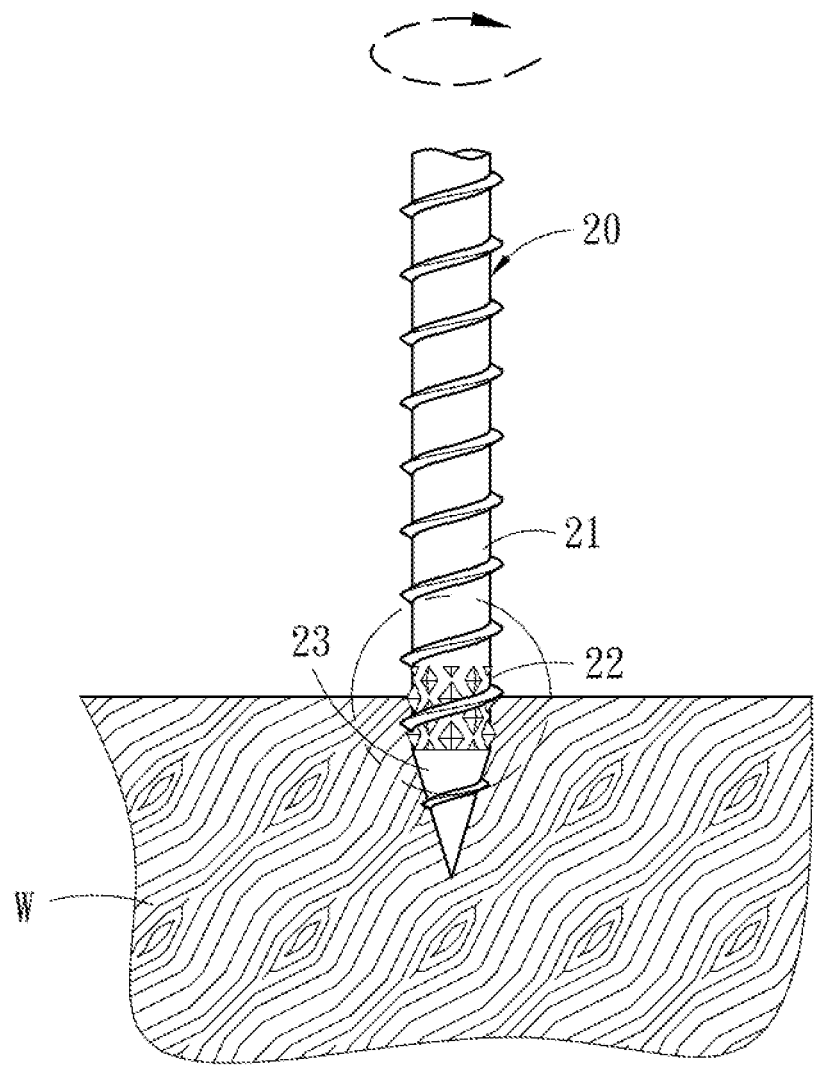
FIG. 3A is a diagram schematically showing the operation of a hole expanding screw according to one embodiment of the present invention.

Refer to FIG. 2B and FIG. 3A. The hole expanding portion 22 includes a plurality of hole expanding blocks 221 arranged into several rows and a plurality of debris exhaust channels 222 formed among the hole expanding blocks 221. Each two neighboring rows of the hole expanding blocks 221 are arranged in a staggered way. Each hole expanding block 221 may be in form of a trigonal pyramid or a tetragonal pyramid. However, the present invention does not particularly limit the shape of the hole expanding block 221. In the embodiment shown in FIG. 2B, each hole expanding block 221 includes a cutting tip 2213 and a plurality of slopes 2214 extending from the cutting tip 2213 and inclined toward the surface of the screw shank 20. The cutting tip 2213 touches the workpiece W by a point contact, which favors cutting off wood fiber. The cut off wood debris slide along the slopes 2214 to the debris exhaust channels 222 and then are exhausted out.

The hole expanding blocks 221 include a plurality of first constructions 2211 formed in the junction of the hole expanding portion 22 and the shank body 21 and the junction of the hole expanding portion 22 and the cone 23, and a plurality of second constructions 2212 formed between the first constructions 2211. The height of the first constructions 2211 is identical to the height of the second constructions 2212. The volume of the second construction 2212 is 1.5-3 times the volume of the first construction 2211. The first constructions 2211 having smaller volume generate less debris than the second constructions 2212 having larger volume. Therefore, a squeezing force toward the screw head 10 is created to exhaust the wood debris. The planar angle of the debris exhaust channel 222 is preferably within 55-70 degrees. The term "planar angle" is defined to be the included angle between the tangent of the screw shank 20 and the projection of the debris exhaust channel 222 on the surface of the screw shank 20. The debris exhaust channels 222 enable the wood debris to move along the direction of the planar angle toward the screw head 10 and make the wood debris exhausted out smooth.

Figure 3B:
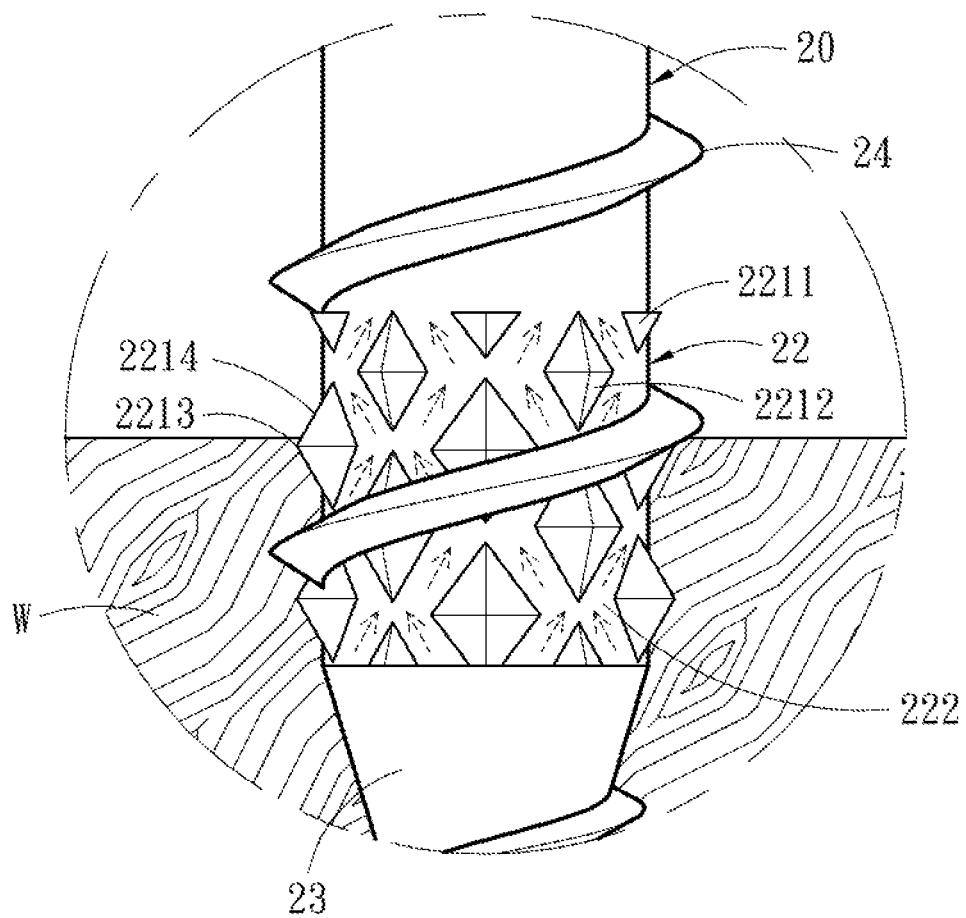
FIG. 3B is a locally enlarged view of FIG. 3A.

Refer to FIG. 3B. In hole expanding, it is the first constructions 2211 that contact the wooden workpiece W firstly. The smaller first constructions 2211 generate less wood debris lest too high a stress crack the wooden workpiece W. Then, the second constructions 2212 enter the wooden workpiece W and generate more wood debris, forcing the wood debris to move upward in a faster speed lest the wooden workpiece W crack during the screwing operation.

The debris exhaust channels 222 are among the hole expanding blocks 221, and the neighboring rows of hole expanding blocks 221 are arranged in a staggered way. Therefore, the debris exhaust channels 222 beside each hole expanding block 221 are in a V-shape form. The wood debris cut off by hole expanding blocks 221 is exhausted in a staggered way along the debris exhaust channels 222 (the arrows with dashed lines indicate the directions of debris movement), which favors uniform release of the stress between the hole expanding screw 100 and the wooden workpiece W, whereby the wood debris is exhausted smooth and the stress between the screw and the workpiece is decreased. Besides, the width of the debris exhaust channel 222 should be smaller than the pitch of the thread 24 lest too large a spacing generate too small a contact area between the screw and the workpiece and cause shaking of the screw.

Figure 4:
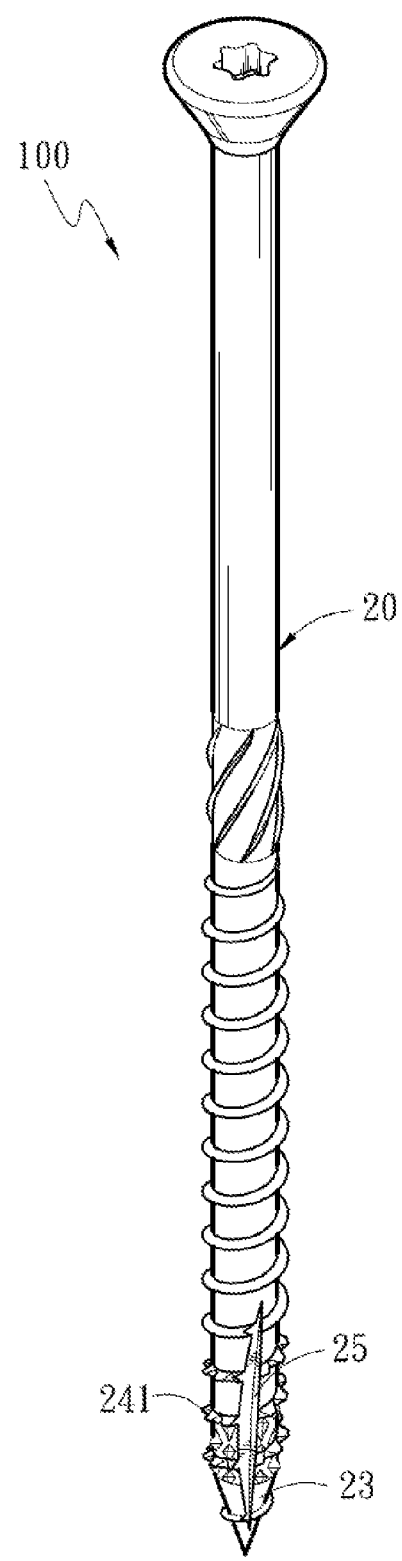
FIG. 4 is a perspective view schematically showing a hole expanding screw according to another embodiment of the present invention.

Refer to FIG. 4. In one embodiment, the screw shank 20 includes a terminal cutting groove 25 formed on one side of the cone 23. The debris generated by screwing can be exhausted through the terminal cutting groove 25 in a faster speed to prevent from that the debris accumulates inside the wooden workpiece W and squeeze mutually lest the frictional force increase and the wooden workpiece crack. In one embodiment, the outer rim of the thread 24 includes a plurality of toothed cutting edges 241, which can effectively decrease the frictional force generated in screw rotation and effectively enhance the fixing security.

What is claimed is:

1. A hole expanding screw comprising:
   a screw head including a top and a neck extending from the top and gradually shrinking toward a direction opposite the top; and
   a screw shank including a shank body connected with the neck, a hole expanding portion connected with the shank body, a cone connected with the hole expanding portion, and a thread running helically from the cone through the hole expanding portion to the shank body, wherein the outer diameter of the hole expanding portion is greater than the diameter of the shank body and smaller than the diameter of the thread, and wherein the hole expanding portion includes a plurality of hole expanding blocks arranged into several rows and a plurality of debris exhaust channels formed among the hole expanding blocks, and wherein each two neighboring rows of the hole expanding blocks are arranged in a staggered way, and each hole expanding block is in form of a pyramid and includes a cutting tip and a plurality of slopes extending from the cutting tip and inclined toward a surface of the screw shank; wherein the shank body includes an oblique thread neighboring one side of the thread, which is corresponding to the screw head.

2. The hole expanding screw according to claim 1, wherein the neck includes a plurality of protrudent ribs.

3. The hole expanding screw according to claim 1, wherein the length of the hole expanding portion is equal to the length of 1-2pitches of the thread.

4. The hole expanding screw according to claim 1, wherein the width of the debris exhaust channel is smaller than the pitch of the thread.

5. The hole expanding screw according to claim 1, wherein a planar angle of the debris exhaust channel is preferably within 55-70degrees.

6. The hole expanding screw according to claim 1, wherein the screw shank includes a terminal cutting groove formed on one side of the cone.

7. The hole expanding screw according to claim 1, wherein the outer rim of the thread includes a plurality of toothed cutting edges.

\* \* \* \* \*